(12) United States Patent
Tomozawa et al.

(10) Patent No.: US 8,672,393 B2
(45) Date of Patent: Mar. 18, 2014

(54) FRONT VEHICLE BODY STRUCTURE

(75) Inventors: Kosaku Tomozawa, Wako (JP); Yushi Nakao, Wako (JP); Takeshi Yoshimoto, Wako (JP); Manabu Ishizono, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 21 days.

(21) Appl. No.: 13/354,732

(22) Filed: Jan. 20, 2012

(65) Prior Publication Data

US 2012/0187720 A1 Jul. 26, 2012

(30) Foreign Application Priority Data

Jan. 26, 2011 (JP) ................................ 2011-014271
Jan. 26, 2011 (JP) ................................ 2011-014300

(51) Int. Cl.
*B62D 21/15* (2006.01)

(52) U.S. Cl.
USPC ................................ 296/187.09; 296/193.09

(58) Field of Classification Search
USPC .................... 296/187.09, 193.09, 204, 203.02
See application file for complete search history.

(56) References Cited

U.S. PATENT DOCUMENTS

| | | | |
|---|---|---|---|
| 6,938,948 B1 * | 9/2005 | Cornell et al. | 296/187.09 |
| 7,556,310 B2 * | 7/2009 | Miki | 296/204 |
| 7,815,245 B2 * | 10/2010 | Hiraishi et al. | 296/187.09 |
| 2004/0200659 A1 * | 10/2004 | Miyasaka | 180/312 |
| 2010/0117403 A1 * | 5/2010 | Kihara et al. | 296/203.02 |

FOREIGN PATENT DOCUMENTS

| | | | |
|---|---|---|---|
| JP | 2005-206079 | | 8/2005 |
| JP | 2007-131150 | | 5/2007 |
| JP | 2007131150 A | * | 5/2007 |
| JP | 2009-051440 | | 3/2009 |
| JP | 2010-280238 | | 12/2010 |
| JP | 2010280238 A | * | 12/2010 |

OTHER PUBLICATIONS

Japanese Office Action dated Jan. 22, 2013, Application No. P2011-014300, and partial English Translation, 6 pages.

* cited by examiner

*Primary Examiner* — Jason S Morrow
*Assistant Examiner* — E Turner Hicks
(74) *Attorney, Agent, or Firm* — Rankin, Hill & Clark LLP

(57) ABSTRACT

Side beam extends from a sub frame, mounted to front side frames, to a front frame section, and includes: a lower impact absorbing bar member having a horizontal intermediate portion joined to the sub frame, and a slanting portion extending upward from the intermediate portion; and a bent impact absorbing member joined to the slanting portion and front frame section and having a smaller strength against an impact than the bar member. Skid plate is mounted to a lower cross beam constituting a lower portion of the frame section and projects forward from the cross beam. Lower impact absorbing bar member is mounted to the cross beam and extends rearward, and an impact absorbing projecting member is provided in front of the bar member. The absorbing projecting member defines a closed sectional shape in conjunction with a rear portion of the skid plate.

10 Claims, 19 Drawing Sheets

FIG.18
(a)
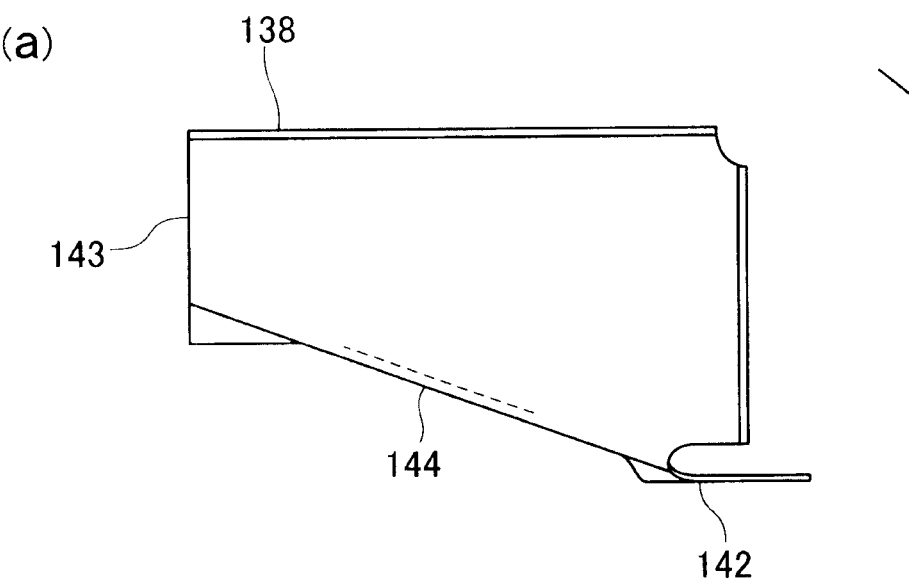
(b)
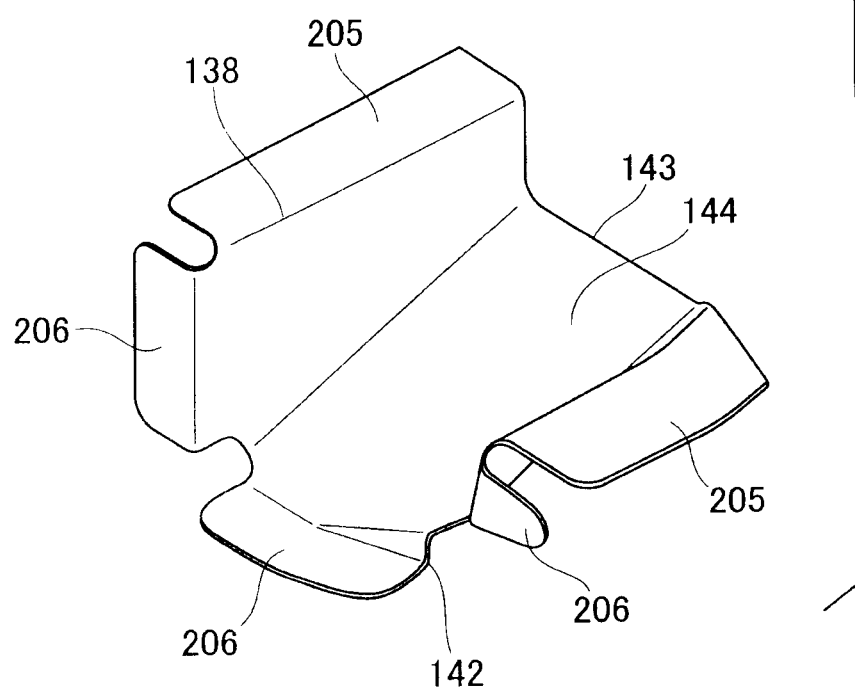

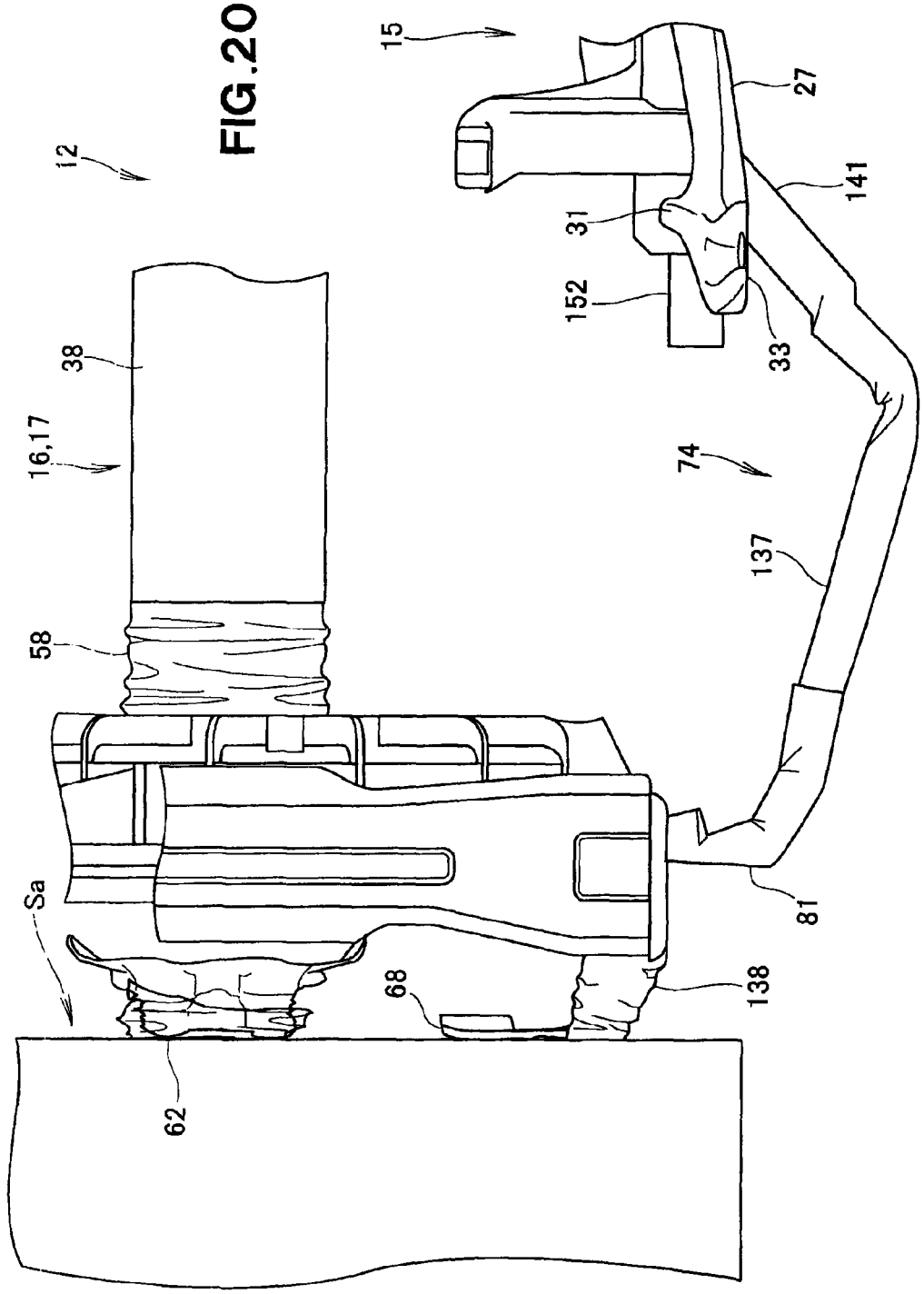

FRONT VEHICLE BODY STRUCTURE

FIELD OF THE INVENTION

The present invention relates to a front vehicle body structure including an impact absorbing beam that extends from a sub frame, provided in front of a floor of a passenger compartment to near the front surface of the vehicle.

The present invention also relates to a front vehicle body structure including members provided inside the front surface of the vehicle for absorbing an impact input to the front surface.

BACKGROUND OF THE INVENTION

Among the conventionally-known front vehicle body structures are one disclosed, for example, in Japanese Patent Application Laid-Open Publication No. 2009-51440 (hereinafter referred to as "patent literature 1"), which includes first impact absorbing sections provided on the front surface of a vehicle and second impact absorbing sections provided under the first impact absorbing sections. The front vehicle body structure disclosed in patent literature 1 is constructed in such a manner that an external impact applied from the front of the vehicle can be absorbed through cooperation between the first impact absorbing sections provided at the distal ends of front side frames extending along front wheels and the second impact absorbing sections provided at the distal ends of lower apron members (beams) disposed under the front side frames.

However, with the front vehicle body structure disclosed in patent literature 1, an impact absorbing amount achieved by the lower apron members (beams) may sometimes become small. Namely, because an impact (load) input to the lower apron members transmits straightly from the lower apron members to a suspension frame (i.e., sub frame) interconnecting respective bases of the lower apron members, the lower apron members have a great buckling strength so that they cannot sufficiently absorb the impact. Further, if an impact input to the front surface of the vehicle cannot be sufficiently absorbed, there would arise a need to increase a front-rear length (crushable zone) of the front body structure.

Also known is a front vehicle body structure which includes an impact absorbing member inside the front surface of the vehicle, as disclosed, for example, in Japanese Patent No. 4521403 (hereinafter referred to as "patent literature 2"). In the front vehicle body structure disclosed in patent literature 2, left and right side supporting struts project from left and right longitudinal arms that are disposed under left and right front side frames extending along left and right front wheels and extend in a front-right direction of the vehicle, and a bar extending in a left-right direction of the vehicle is mounted to the respective distal (front) ends of the side supporting posts. Further, a center supporting strut is connected to a central portion of the bar in parallel to the side supporting struts and supported via the longitudinal arms.

However, in the front vehicle body structure disclosed in patent literature 2, which is constructed in such a manner that an impact input to the front surface transmits from the left and right side supporting struts straightly to the left and right longitudinal arms extending in the front-right direction, the left and right longitudinal arms would have a great buckling strength and thus cannot sufficiently absorb the input impact. Further, if an impact input to the front surface of the vehicle cannot be sufficiently absorbed like this, there would arise a need to increase a front-rear length (crushable zone) of the front body structure.

SUMMARY OF THE INVENTION

In view of the foregoing prior art problems, it is an object of the present invention to provide an improved front vehicle body structure which can not only sufficiently absorb an impact (load) input to the front surface of the vehicle but also reduce the front-rear length of the crushable zone, and which supports an engine accessory (e.g., compressor) in a space formed therein.

It is another object of the present invention to provide an improved front vehicle body structure which can reduce the front-rear length of the crushable zone without impairing impact absorbing performance.

In order to accomplish the above-mentioned objects, the present invention provides an improved front vehicle body structure, which comprises: a sub frame disposed in front of a floor of a passenger compartment of a vehicle and extending in a left-right direction of the vehicle to be mounted to left and right front side frames that extend forward from the passenger compartment; and left and right side beams extending from the sub frame to a front frame section of the front vehicle body structure. Each of the side beams includes: a lower impact absorbing bar member having a horizontal intermediate portion joined to and extending forward from a front wall of the sub frame facing forward of the vehicle, and a slanting portion extending obliquely upward continuously from the horizontal intermediate portion; and a bent impact absorbing member joined to the slanting portion and to the front frame section and having a smaller mechanical strength against an impact, input to a front surface of the vehicle, than the lower impact absorbing bar member.

In the front vehicle body structure of the present invention, the lower impact absorbing bar of each of the side beams has the horizontal intermediate portion joined to the front wall of the sub frame facing forward of the vehicle and the slanting portion extending obliquely upward continuously from the horizontal intermediate portion, and the bent impact absorbing member of each of the side beams is joined to the slanting portion and to the front frame section and having a smaller mechanical strength against an impact, input to the front surface of the vehicle, than the lower impact absorbing bar member. Thus, once an impact (load) is input to the front surface of the vehicle, the bent impact absorbing member, having a smaller mechanical strength, bends or flexurally deforms with its upper surface "valley-folded" in response to the input impact. In this way, the front vehicle body structure of the present invention can effectively absorb a relatively small impact while achieving a reduced length, in the front-rear direction of the vehicle, of a deformed zone or crushable zone of the vehicle.

Further, after the bending or flexural deformation of the bent impact absorbing member, the front frame section (bulkhead), located higher than the bent impact absorbing member, is displaced rearward to transmit the impact to the bent impact absorbing member, so that the lower impact absorbing bar member can absorb the impact while bending downward into a V shape in response to the impact.

Furthermore, the bent impact absorbing member of each of the side beams extends slanting downward from the front frame section, and thus, a space above the bent impact absorbing member can have a greater size than in the case where the bent impact absorbing member extends horizontally from the front frame section. In this way, a desired engine accessory (e.g., compressor) can be placed in the space provided above the bent impact absorbing member.

Preferably, in the front vehicle body structure of the present invention, the bent impact absorbing member of each of the side beams has an upper surface contacting and joined to the lower surface of the front frame section. Thus, after the bent impact absorbing member deforms in response to the input impact, the impact (load) can be compressively transmitted from the front frame section to the lower impact absorbing bar member, located below the front frame section, via the upper surface of the bent impact absorbing member. As a consequence, the bent impact absorbing member can be easily bent or flexually deformed with its upper surface valley-folded.

Further, preferably, the front vehicle body structure of the present invention further comprises an impact absorbing projecting member provided in front of the bent impact absorbing member of each of the side beams, the impact absorbing projecting member extending substantially collinearly with a corresponding one of the bent impact absorbing members as viewed in plan of the vehicle and being located at substantially the same height as the bent impact absorbing member as viewed in side elevation of the vehicle. Thus, once an impact (load) is input to the front surface of the vehicle, the impact absorbing projecting member disposed near the front surface of the vehicle is compressively deformed, in response to the input impact, to thereby start absorbing the impact. As a result, the front vehicle body structure can absorb a smaller impact and thereby achieve enhanced impact absorbing performance.

Further, preferably, in the front vehicle body structure of the present invention, the sub frame includes the front wall facing forward of the vehicle, and a front arm connection section integrally provided on the front wall of the sub frame and supporting, on each of left and right end portions thereof, a lower arm of a suspension device. The lower impact absorbing bar member is joined at a rear end portion thereof to the front wall of the sub frame having the front arm connection section provided thereon. Thus, once an input impact (load) is transmitted from the front surface of the vehicle to the lower impact absorbing bar member, it transmits from the lower impact absorbing bar members to the neighboring lower arm via the front wall. Then, the impact (load) can be dispersed from the lower arm to the vehicle body.

Further, preferably, the front vehicle body structure of the present invention further comprises a skid plate projecting forwardly of the vehicle from the front frame section, and the impact absorbing projecting member is joined integrally to the skid plate. The projecting skid plate can be reinforced by the impact absorbing projecting member of each of the side beams, and thus, the projecting skid plate can effectively sweep and thereby protect legs of a pedestrian etc. Further, the projecting skid plate can be mounted in place with ease.

The present invention further provides an improved front vehicle body structure, which comprises: a front frame section mounted to respective front ends of left and right front side frames extending forward from a passenger compartment of a vehicle; a skid plate mounted to a lower cross beam extending in a left-right direction of the vehicle and constituting a lower portion of the front frame section, the skid plate projecting forward of the vehicle from the lower cross beam; left and right lower impact absorbing bar members mounted to the lower cross beam and extending rearward of the vehicle; and left and right impact absorbing projecting members disposed in front of corresponding ones of the left and right lower impact absorbing bar members, each of the impact absorbing projecting members defining a closed sectional shape in conjunction with a rear portion of the skid plate.

The front vehicle body structure of the present invention arranged in the aforementioned manner can not only protect legs of a pedestrian by means of the skid plate, but also effectively absorb an impact caused by contact (collision) with an external object, such as another vehicle, by means of each of the impact absorbing projecting members. As a result, the present invention can reduce a deformation amount (impact absorbing margin or crushable zone) of the front vehicle body structure necessary for absorbing an input impact, and thus can reduce the front-rear length of the crushable zone.

Preferably, in the front vehicle body structure of the present invention, each of the impact absorbing projecting members is located higher than the corresponding lower impact absorbing bar member. Once an impact (load) is input to the front surface of the vehicle, an eccentric impact is transmitted from the impact absorbing projecting member to the lower impact absorbing bar member located below the impact absorbing projecting member, so that the lower impact absorbing bar starts bending. In this way, the lower impact absorbing bar can easily bend or flexurally deform with its upper surface "valley-folded" in response to the input impact and thereby effectively absorb the input impact.

Further, preferably, in the front vehicle body structure of the present invention, each of the impact absorbing projecting members has a triangular shape and tapers toward a front end thereof to thereby provide a slanting impact absorbing frame portion, as viewed in side elevation of the vehicle. Thus, once an impact (load) is input to the front surface of the vehicle, the impact absorbing projecting member can absorb the impact by compressively deforming starting at its front end.

Furthermore, preferably, in the front vehicle body structure of the present invention, the skid plate has a bead extending in the front-rear direction of the vehicle along the impact absorbing projecting members. Thus, the skid plate can have an increased mechanical strength against an impact (load) input to the front surface of the vehicle.

Furthermore, preferably, in the front vehicle body structure of the present invention, each of the lower impact absorbing bar members is joined at a rear end portion thereof to a sub frame disposed in front of a floor of the passenger compartment and mounted to the left and right front side frames. Thus, an input impact (load) can be effectively absorbed by being dispersed from the lower impact absorbing bar members to the sub frame.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 18 shows details of the impact absorbing projecting member, of which (a) is side view of the impact absorbing projecting member and (b) is a perspective view of the impact absorbing projecting member;

FIG. 20 is a view explanatory of a mechanism provided in the embodiment of the front vehicle body structure for absorbing an impact.

DETAILED DESCRIPTION OF THE INVENTION

Figure 1:
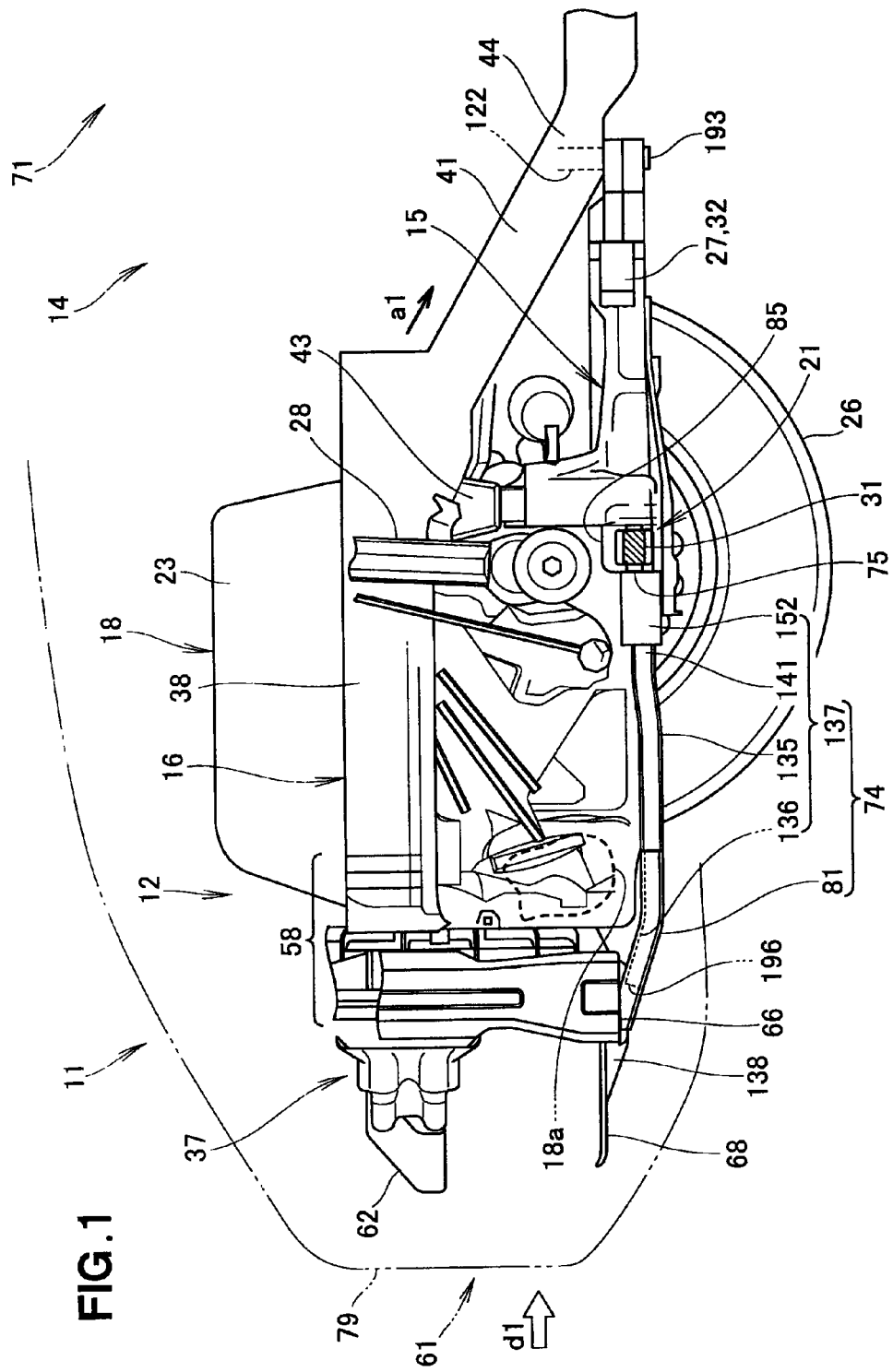
FIG. 1 is a sectional view showing an outline of a construction of a vehicle provided with an embodiment of a front vehicle body structure of the present invention.
Figure 2:
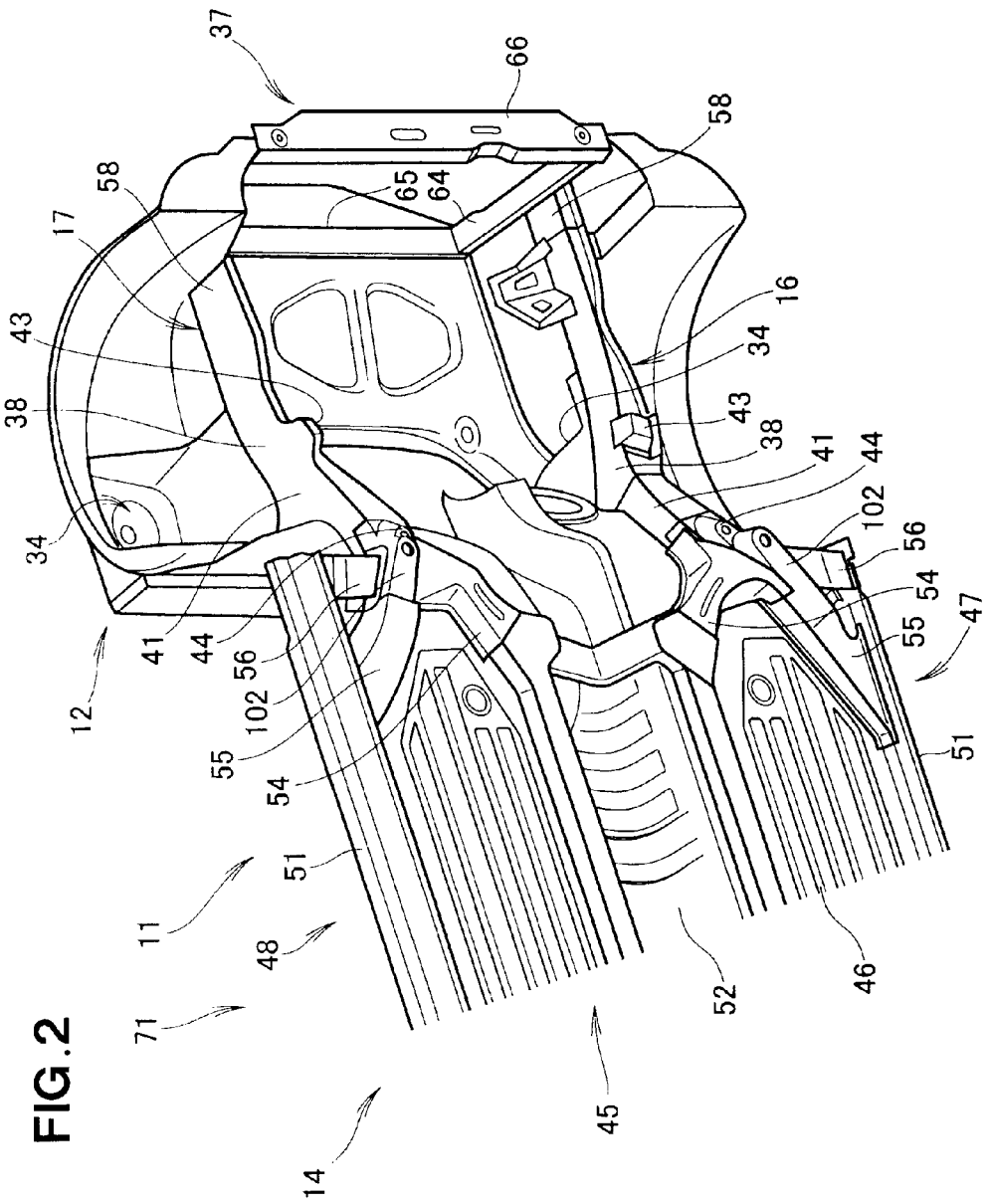
FIG. 2 is a perspective view of the embodiment of the front vehicle body structure taken from lower right of the front vehicle body structure.
Figure 3:
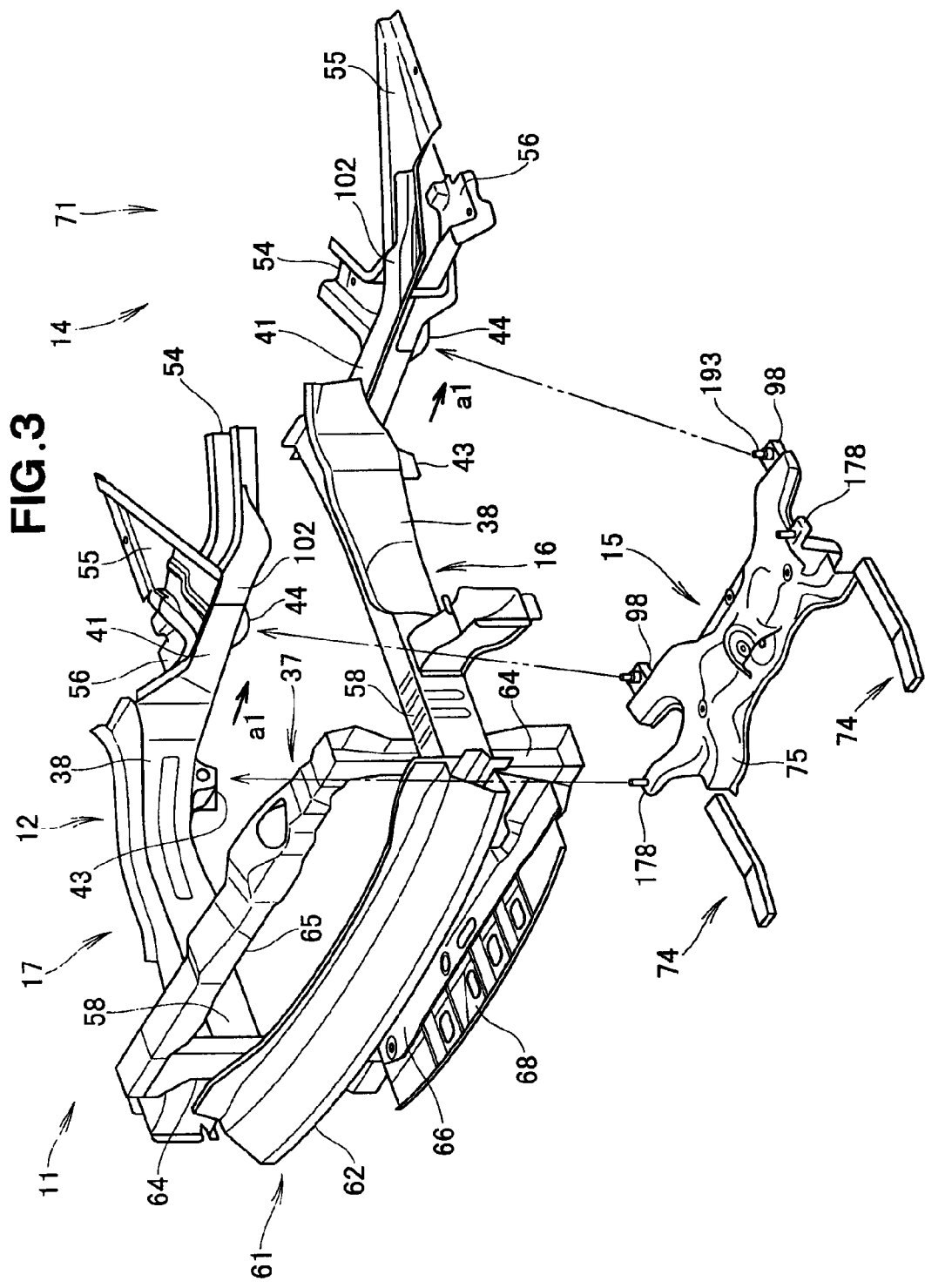
FIG. 3 is an exploded perspective view of the embodiment of the front vehicle body structure.

A vehicle 11 is provided with an embodiment of a front vehicle body structure 12 of the present invention, as shown in FIGS. 1 to 3. The front vehicle body structure 12, which constitutes a front part of a vehicle body 14, includes a sub frame 15. The front body structure 12 supports front suspension devices 21 with an engine placed on the sub frame 15 and left and right front side frames 16 and 17. In the following description, terms "left" and "right" refer to left and right directions as viewed from a human driver seated in a driver's seat facing forward.

Figure 5:
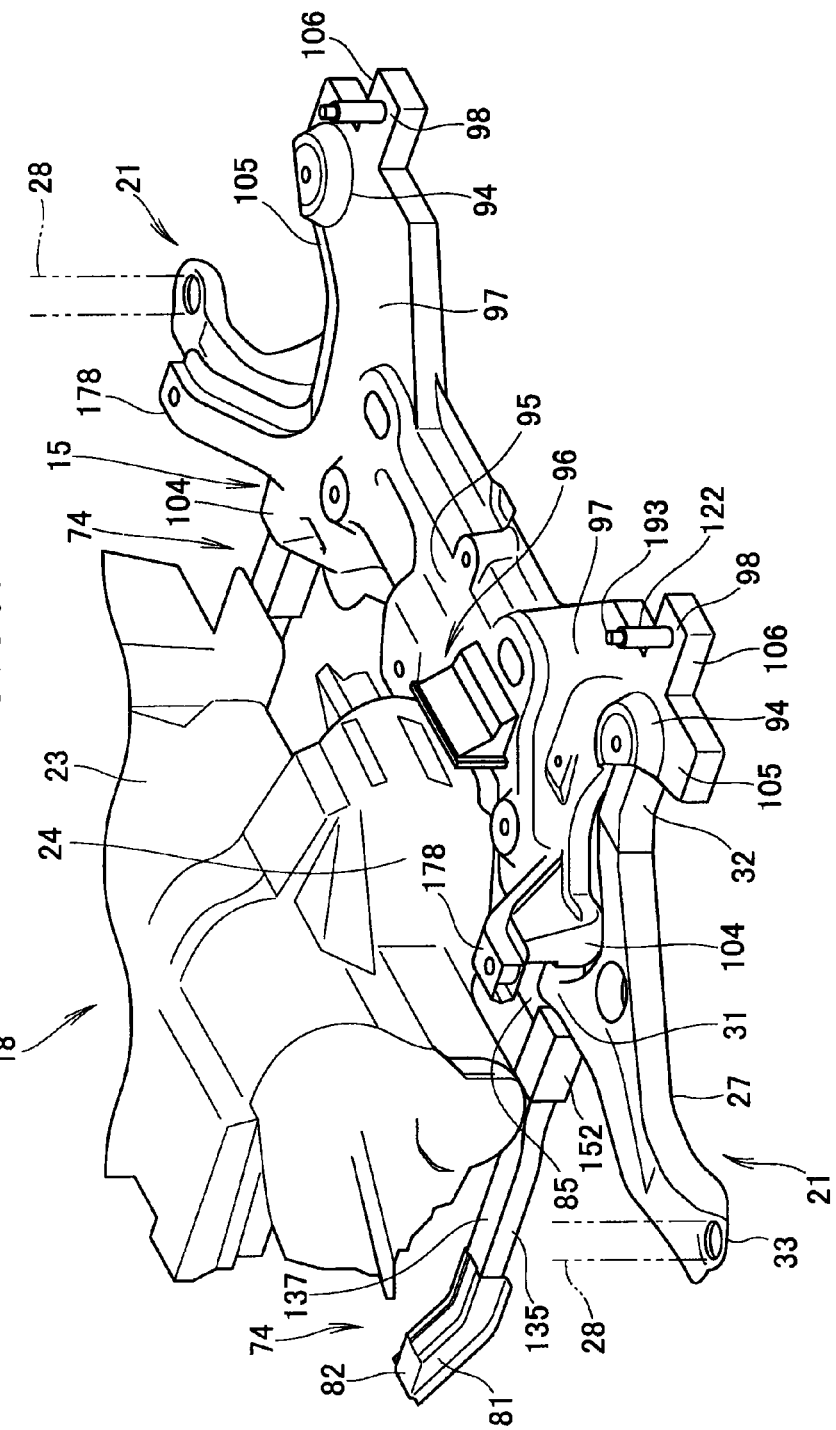
FIG. 5 is a perspective view of a sub frame and side beams of the embodiment of the front vehicle body structure.
Figure 6:
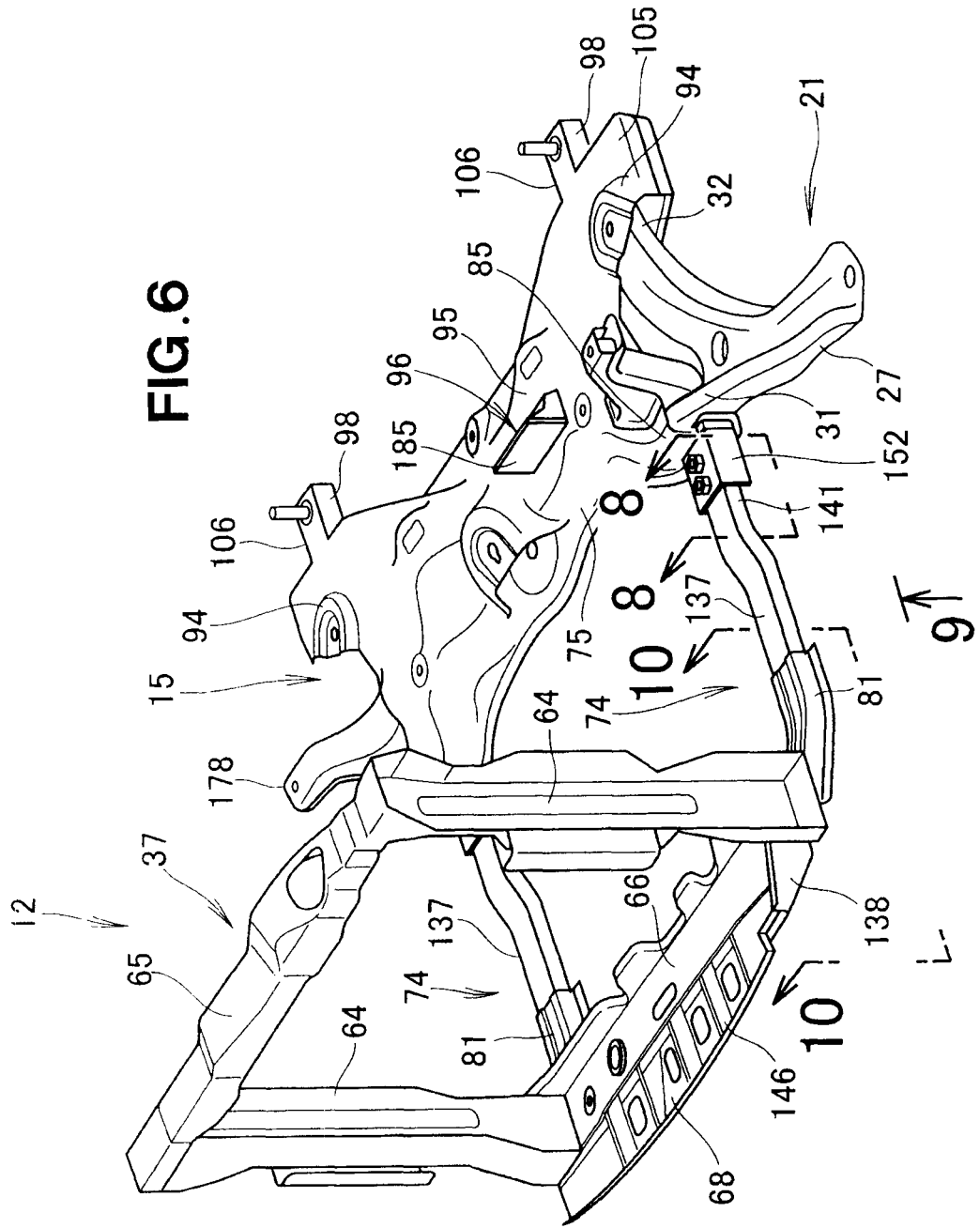
FIG. 6 is a perspective view of a front frame section (bulkhead), sub frame and side beams of the embodiment of the front vehicle body structure.

As shown in FIGS. 1, 5 and 6, the engine 18, which is a conventional-type transversely-mounted engine, includes an engine body 23 located on the right of the engine 18, a transmission 24 connected to the left of the engine body 23, and an engine accessory (e.g., compressor) 18a disposed above a right side beam 74.

Figure 9:
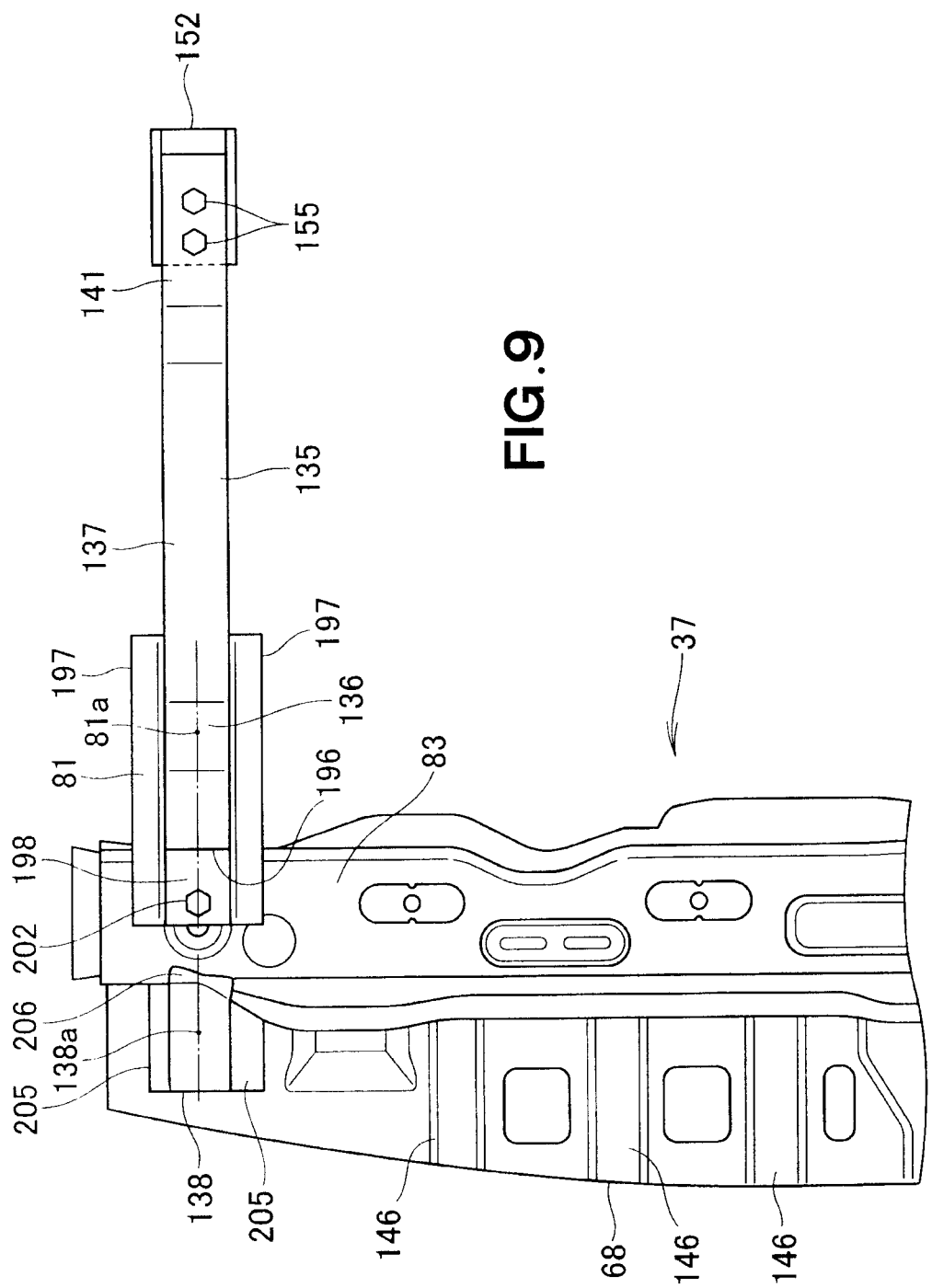
FIG. 9 is a view taken in a direction of arrow 9 of FIG. 6.

As shown in FIGS. 5, 6 and 9, the front suspension device 21, which is of the MacPherson Strut type, includes a lower arm 27 supporting a front wheel 26 (FIG. 1), and a damper (strut) 28 fixedly mounted at its lower end to the lower arm 27 and extending upward from the lower arm 27.

The lower arm 27 is a conventional-type hollow casting formed of iron (steel) or aluminum alloy and having a greater mechanical strength than the sub frame 15 formed of a steel plate. The lower arm 27 includes a front connection end 31 connected to the sub frame 15, a rear connection end 32, a distal-end link section 33 connecting thereto the lower end of the damper 28 supporting the front wheel 26. The damper 28 is fixedly connected at its upper end to a damper housing 34 (FIG. 2) of the front body structure 12.

The front body structure 12 includes left and right front side frames 16 and 17 extending forward from a passenger compartment of the vehicle, a front frame section (bulkhead) 37 fixedly mounted on the respective distal (front) ends of the left and right front side frames 16 and 17, and the damper housing 34 mounted on and extending upward from the left and right front side frames 16 and 17.

As shown in FIGS. 1 to 4, the left and right front side frames 16 and 17 each include a substantially horizontal frame body 38, and a front floor frame 41 slanting rearwardly and downwardly (i.e., in a direction of arrow a1) from the frame body 38.

The sub frame 15 is fastened from below to a front frame fastening section 43 provided on a middle portion of each of the front floor frames 41 and to a rear frame fastening section 44 provided on a rear portion of each of the front floor frames 41, so that the front floor frames 41 are integrally joined to a floor (under body) 45.

As shown in FIG. 2, the under body 45 joins left and right side edge portions of a front floor panel 46 to respective side sills 51 of left and right side bodies 47 and 48. The under body 45 includes the front floor panel 46, a tunnel section 52 provided on a middle portion, in a left-right direction of the vehicle 11, of the front floor panel 46, floor center frames 54 extending from corresponding ones of the front floor frames 41 shown in FIGS. 2 to 4, floor frames 55, and outriggers 56. The rear ends of the floor frames 55 and the outer ends of the outriggers 56 are fixedly joined to the side sills 51 behind the left and right front side frames 16 and 17.

Further, in the left and right front side frames 16 and 17, respective front portions of the frame bodies 38 are constructed as front impact absorbing sections 58, and a bumper beam 62 of a bumper device 61 is fixedly mounted to the front impact absorbing sections 58. The front impact absorbing sections 58 directly absorb an impact (load) applied or input to the bumper beam 62.

The bumper beam 62 is fixedly connected directly to the distal ends of the front impact absorbing sections 58. Namely, no additional element for absorbing an impact (load) input to the bumper beam 62 is provided between the bumper beam 62 and the front side frames 16 and 17.

The front frame section (bulkhead) 37 is fixedly mounted to and extends between the inner surfaces of the front impact absorbing sections 58. The front frame section (bulkhead) 37 includes: front side bulkheads 64 provided on and extended upward from the front side frames 16 and 17; an upper frame 65 joined to respective upper end portions of the front side bulkheads 64; a front lower cross member 66 fixedly joined to respective lower end portions of the front side bulkheads 64; and a skid plate 68 joined to the front end edge of the lower cross member 66.

Next, a description will be given about primary sections of the front vehicle body structure 12, with reference to FIGS. 1 to 20.

The front body structure 12 includes the sub frame 15 extending in the left-right direction of the vehicle 11, and the sub frame 15 is disposed in front of the floor (under body) 45 of the passenger compartment 71 and fixedly mounted to the left and right front side frames 16 and 17 connecting to the passenger compartment 71, i.e. extending forward from the passenger compartment 71. The front body structure 12 also includes the side beams 74 extending from the sub frame 15 to the front frame section (bulkhead) 37.

Each of the side beams 74 includes: a lower impact absorbing bar member 137 having a horizontal intermediate portion 135 that is joined to a front wall 75 of the sub frame 15 facing forward of the vehicle 11 and that extends forward of the vehicle 11, and a slanting portion 136 extending obliquely upward continuously from the horizontal intermediate portion 135; and a bent impact absorbing member 81 joined to the slanting portion 136 and front frame section (bulkhead) 37 and having a smaller mechanical strength against an impact, input to the front surface 79 of the vehicle 11, than the lower impact absorbing bar member 137.

In each of the side beams 74, the bent impact absorbing member 81 has its upper surface 82 joined to the lower surface 83 (FIGS. 9 and 10) of the front frame section (bulkhead) 37. An impact absorbing projecting member 138 is provided in front of the bent impact absorbing member 81 to extend collinearly with the bent impact absorbing member 81 (see FIG. 9) as viewed in plan of the vehicle.

The sub frame 15 includes the front wall 75 facing forward of the vehicle 11, and a front arm connection section 85 integrally formed with the front wall 75 and supporting on its left and right end portions the lower arms 27 of the front suspension devices 21. Each of the lower impact absorbing bar members 137 is joined at its rear end portion 141 to the front wall 75 having the front arm connection section 85 provided thereon.

The skid plate 68 projects forwardly of the vehicle 11 from the front frame section (bulkhead) 37, and the impact absorbing projecting member 138 is integrally joined to the skid plate 68.

The following describe the front vehicle body structure 12 in greater detail. The front vehicle body structure 12 includes the side beams 74 each including the aforementioned lower impact absorbing bar member 137, bent impact absorbing member 81 and impact absorbing projecting member 138, and skid plate 68.

Figure 7:
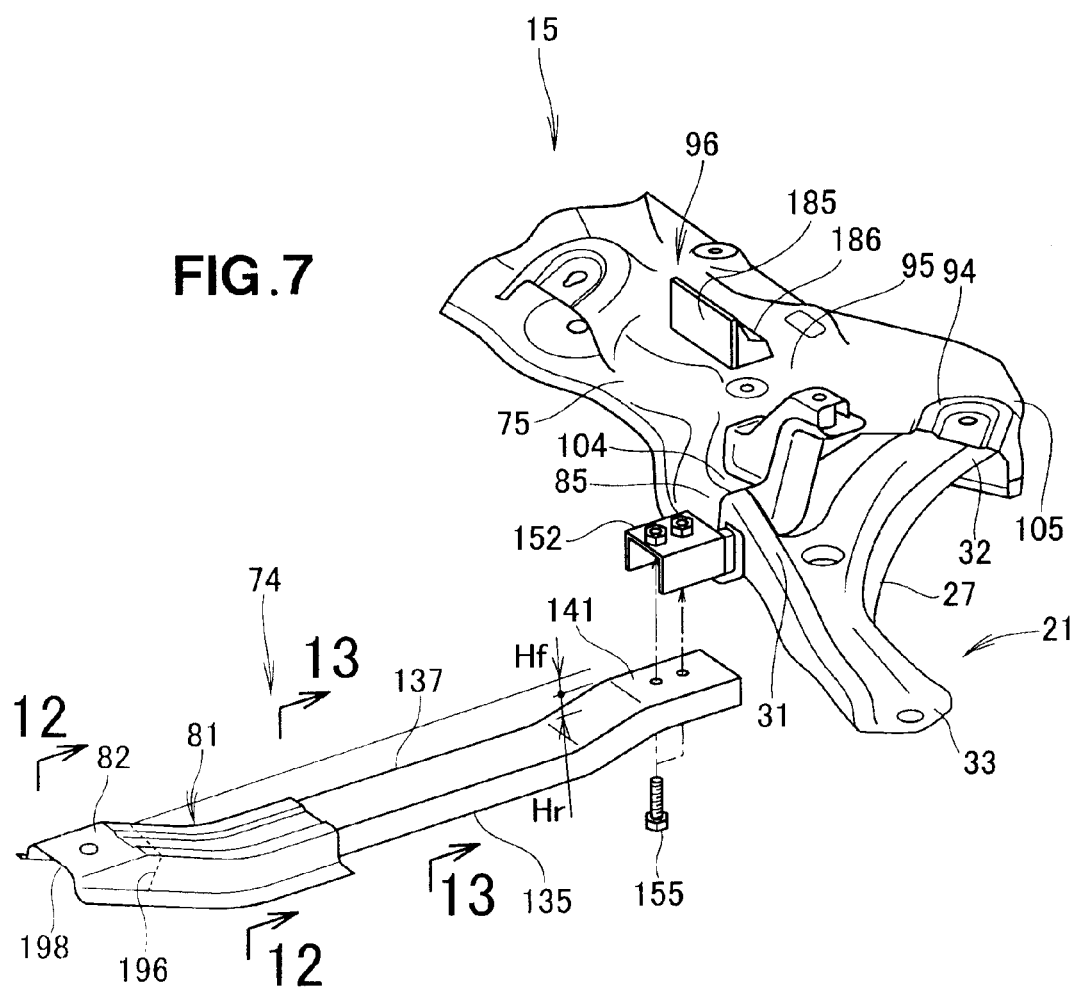
FIG. 7 is a perspective view showing the embodiment of the front vehicle body structure with the side beams removed therefrom.
Figure 11:
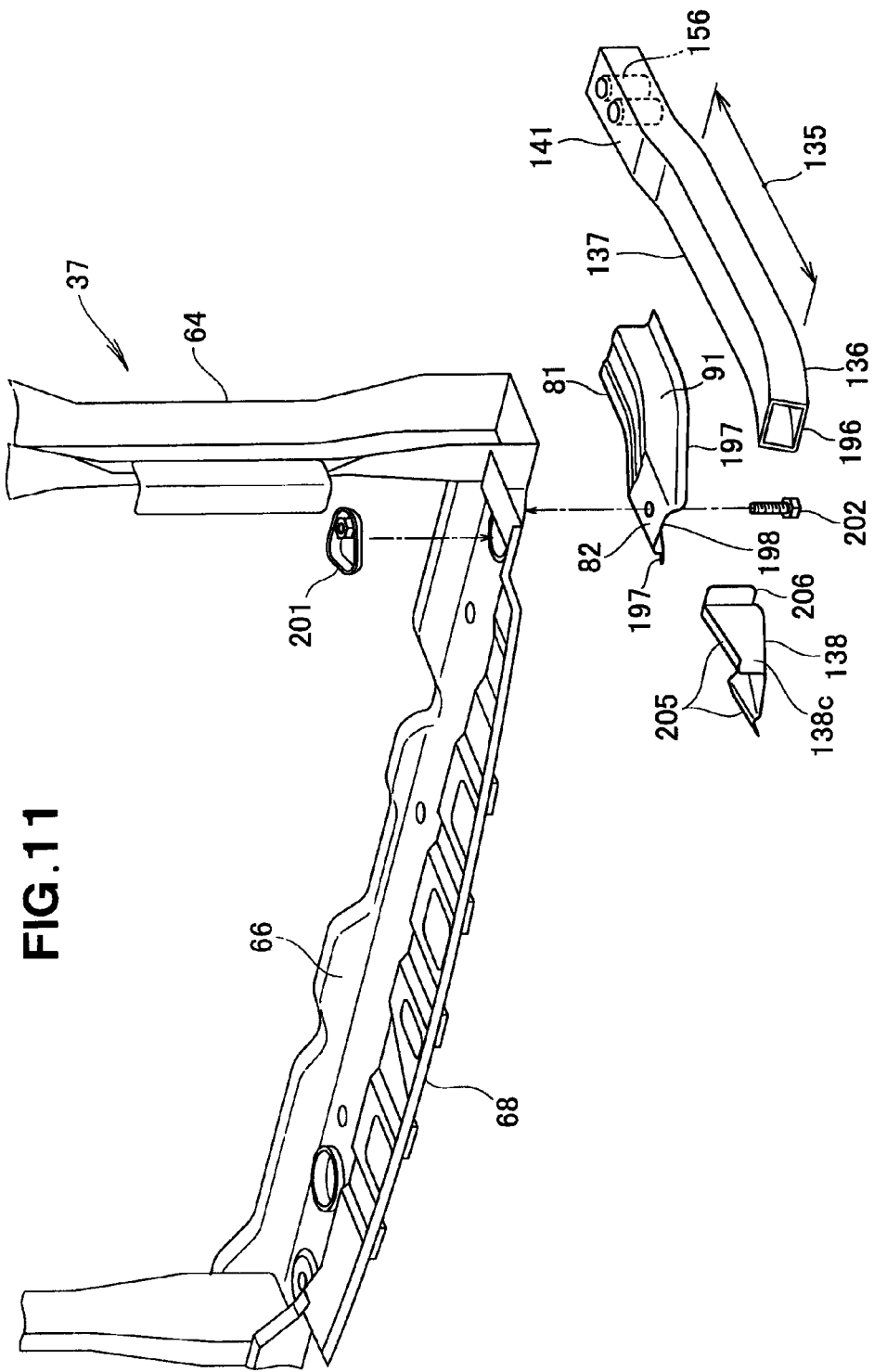
FIG. 11 is a perspective view of the side beam for mounting to the front frame section.
Figure 12:
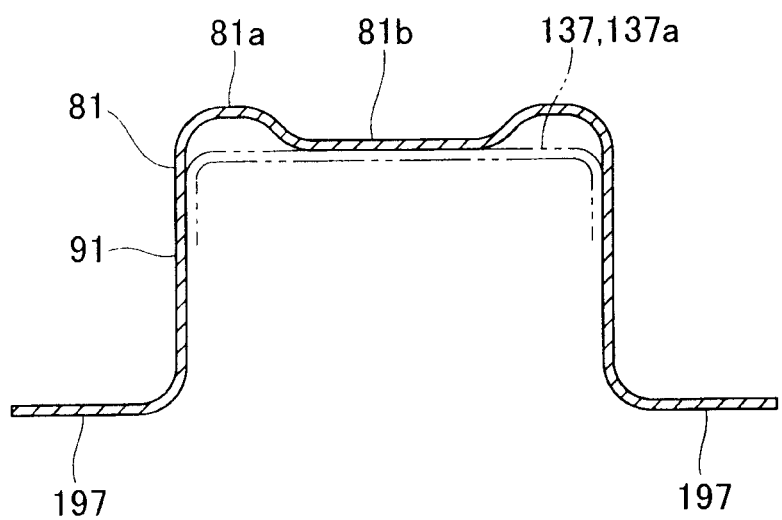
FIG. 12 is a sectional view taken along the 12-12 line of FIG. 7.
Figure 13:
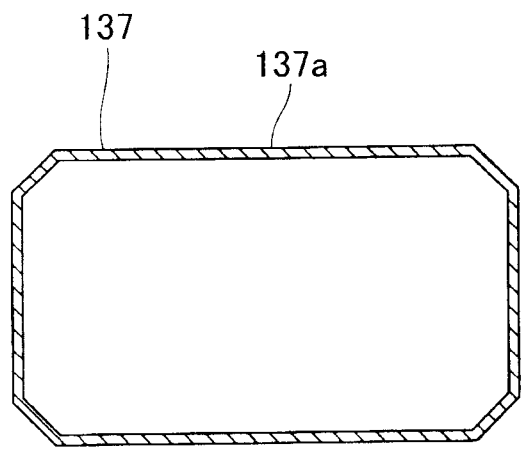
FIG. 13 is a sectional view taken along the 13-13 line of FIG. 7.

Each of the lower impact absorbing bar members 137, as shown in FIGS. 7 and 11, includes a tubular body of a generally rectangular cross-sectional shape (see FIG. 13) having the horizontal intermediate portion 135 that is formed to extend straightly, and a front end portion 196 of the lower impact absorbing bar member 137 is located higher by a distance Hf than the rear end portion 141 of the lower impact absorbing bar member 137. The horizontal intermediate portion 135 is located lower by a distance Hr than the rear end portion 141, and the slanting portion 136 has the above-mentioned front end portion 196.

Figure 8:
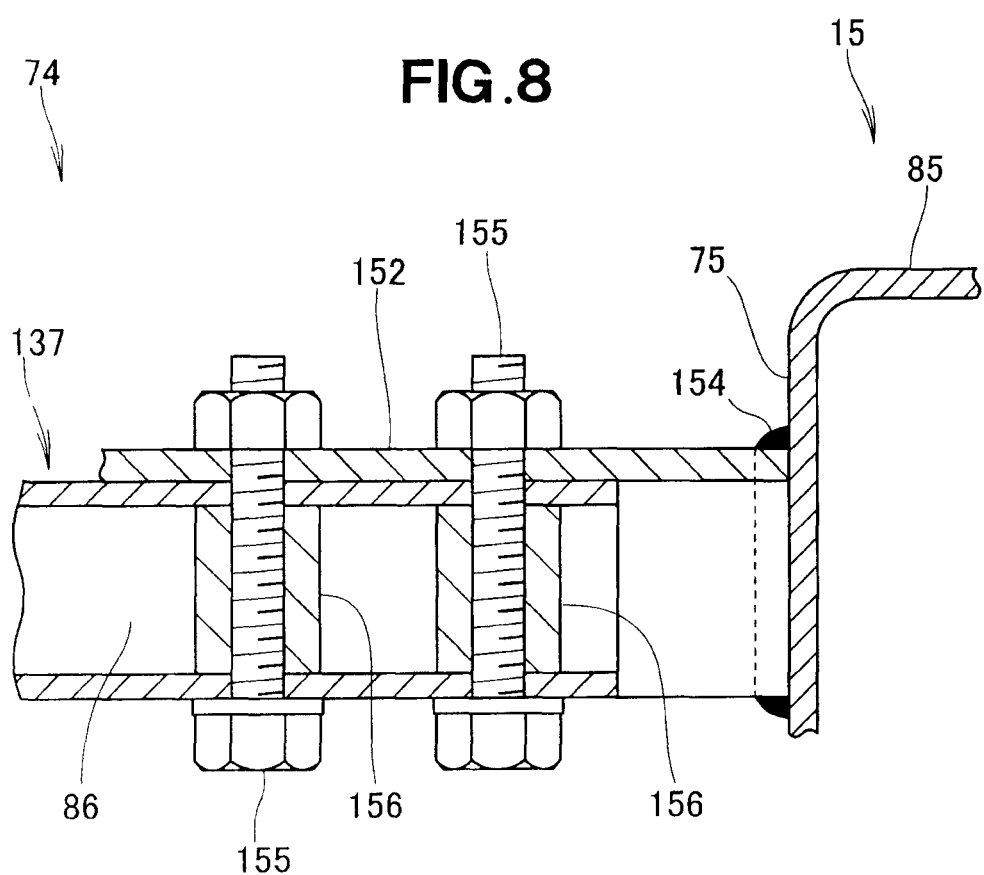
FIG. 8 is a sectional view taken along the 8-8 line of FIG. 6.

As shown in FIGS. 6 to 8, the front vehicle body structure 12 further includes left and right fastening brackets 152 each for fastening the rear end portion 141 of a corresponding one of the lower impact absorbing bar members 137. The fastening bracket 152 has an inverted-U cross-sectional shape and is fixedly joined to the front wall 75 by welding at welding portions 154 with its opening facing downward. In each of the lower impact absorbing bar members 137, a fastening force transmitting section 156 is formed in the rear end portion 141 for transmitting axial fastening force via a bolt 155.

Figure 10:
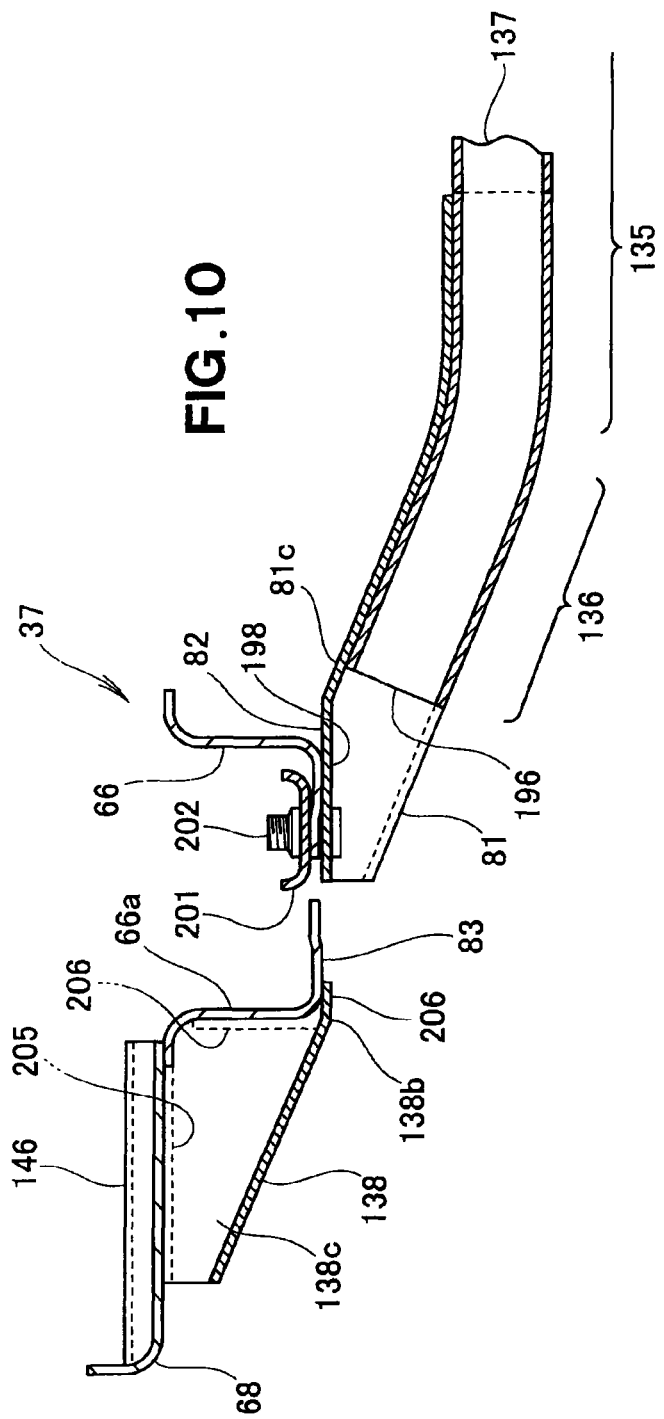
FIG. 10 is a sectional view taken along the 10-10 line of FIG. 6.

In each of the side beams 74, as shown in FIGS. 9 and 10, the slanting portion 136 and the horizontal intermediate portion 135 located adjoining the slanting portion 136 are fitted in and fixedly joined to the bent impact absorbing member 81 by welding.

The bent impact absorbing member 81, which is formed by plastically processing a steel plate, includes an absorbing frame section 91 of an inverted-U-sectional shape with a downward opening oriented downwardly of the vehicle 11, and flange portions 197 are formed on and along opposite edge portions of the bent impact absorbing member 81, as shown in FIGS. 7, 9 and 10 to 12.

The bent impact absorbing member 81 has a bead 81b formed on its peak portion 81a. In a region of the bent impact absorbing member 81 where the lower impact absorbing bar member 137 is fitted, the bent impact absorbing member 81 is held in contact with a ceiling portion 137a of the absorbing bar member 137, so that an increased mechanical strength of the bent impact absorbing member 81 can be achieved.

A front absorbing portion 198 of the bent impact absorbing member 81 (i.e., remaining portion of the bent impact absorbing member 81 in which the lower impact absorbing bar member 137 is not fitted) is fastened to the front lower cross member 66 by means of a bolt 202 screwed into a nut plate 201 of the front lower cross member 66 of the front frame section (bulkhead) 37.

The impact absorbing projecting member 138 is provided in front of the bent impact absorbing member 81 in the aforementioned manner, i.e. in such a manner that the bent impact absorbing member 81 extends collinearly with the impact absorbing projecting member 138 as viewed in plan of the vehicle, i.e. in such a manner that the axis line 138a of the projecting member 138 lies in alignment with the axis line 81a of the absorbing member 81 as viewed in plan of the vehicle (i.e., as viewed from the back side of FIG. 9). Further, as viewed in side elevation of the vehicle (e.g., as shown in FIG. 10), the upper surface 82 of the bent impact absorbing member 81 is located at substantially the same height (in a vertical or up-down direction of the vehicle) as the lower end 138b of the impact absorbing projecting member 138.

The impact absorbing projecting member 138, which is formed by plastically processing a steel plate, has a triangular sectional shape and tapers in the forward direction of the vehicle as viewed in side elevation (e.g., as viewed in FIGS. 10 and 16), as shown in FIGS. 9 to 11, and 16 to 18.

Further, the impact absorbing projecting member 138 integrally has an absorbing body 138c, an upper flange 205 and a base flange 206. The base flange 206 is overlapped with and fixedly joined to a front wall portion 66a of the front lower cross member 66 of the front frame section (bulkhead) 37. Further, the upper flange 205 is overlapped with and fixedly joined to the skid plate 68 and forms a closed sectional shape in conjunction with the skid plate 68.

Figure 14:
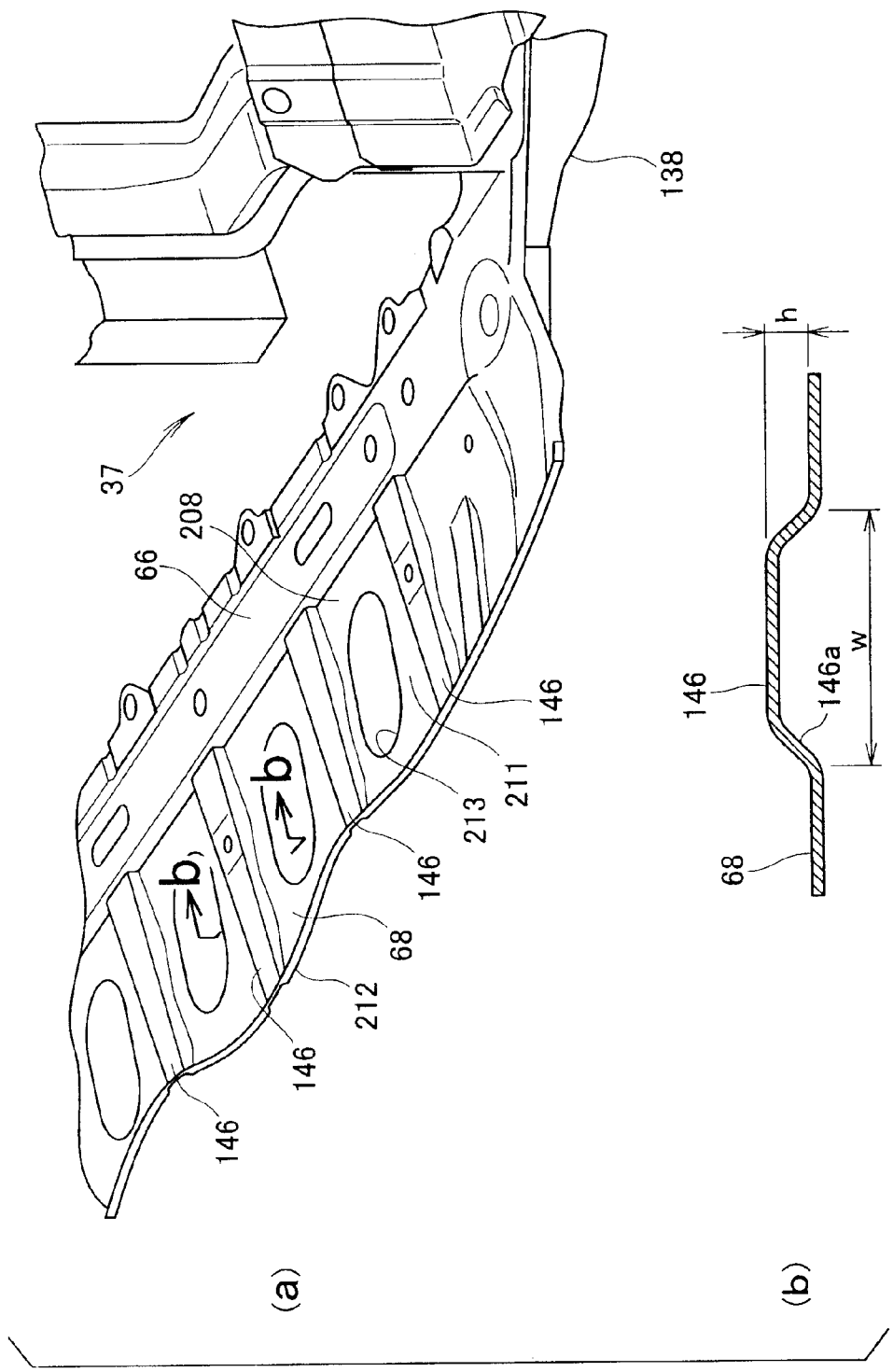
FIG. 14 is a view showing a skit plate, of which (a) is a perspective view of the skit plate and (b) is sectional view taken along the b-b line of (a)

As shown in FIG. 14, the skid plate 68, which is formed by plastically processing a steel plate, includes: a base end portion 208 fixedly joined to the front lower cross member 66 of the front frame section (bulkhead) 37; an impact deformation portion 211 integrally connecting to the base end portion 208; a front distal end portion 212 integrally connecting to the impact deformation portion 211; opening portions 213 formed in the impact deformation portion 211; and beads 146 provided between the opening portions 213.

Each of the beads 146 has an inverted channel shape with an opening 146a facing downward, extends along the impact absorbing projecting member 138 in the front-rear direction from the base end portion 208 to the front distal end portion 212, and has a height h and a width w. Namely, each of the beads 146 extends parallel to the impact absorbing projecting member 138 and adjacent to, or at any given distance from, the impact absorbing projecting member 138. The provision of such beads 146 can secure a desired mechanical strength of the skid plate 68. As a result, it is possible to not only minimize downward sagging or bending of the front distal end portion 212 of the skid plate 68, but also set a desired amount of an impact (load) to be absorbed.

The skid plate 68 projecting in the forward direction of the vehicle 11 is connected to the lower cross beam (lower cross member) 66 extending in the left-right direction of the vehicle and constituting a lower portion of the front frame section (bulkhead 37), and the lower impact absorbing member 137 extending in the rearward direction of the vehicle 11 is also connected to the lower cross beam (lower cross member) 66. Further, the impact absorbing member 138 defining the closed sectional shape in conjunction of the rear portion of the skid plate 68 is provided in front of the lower impact absorbing member 137.

Figure 16:
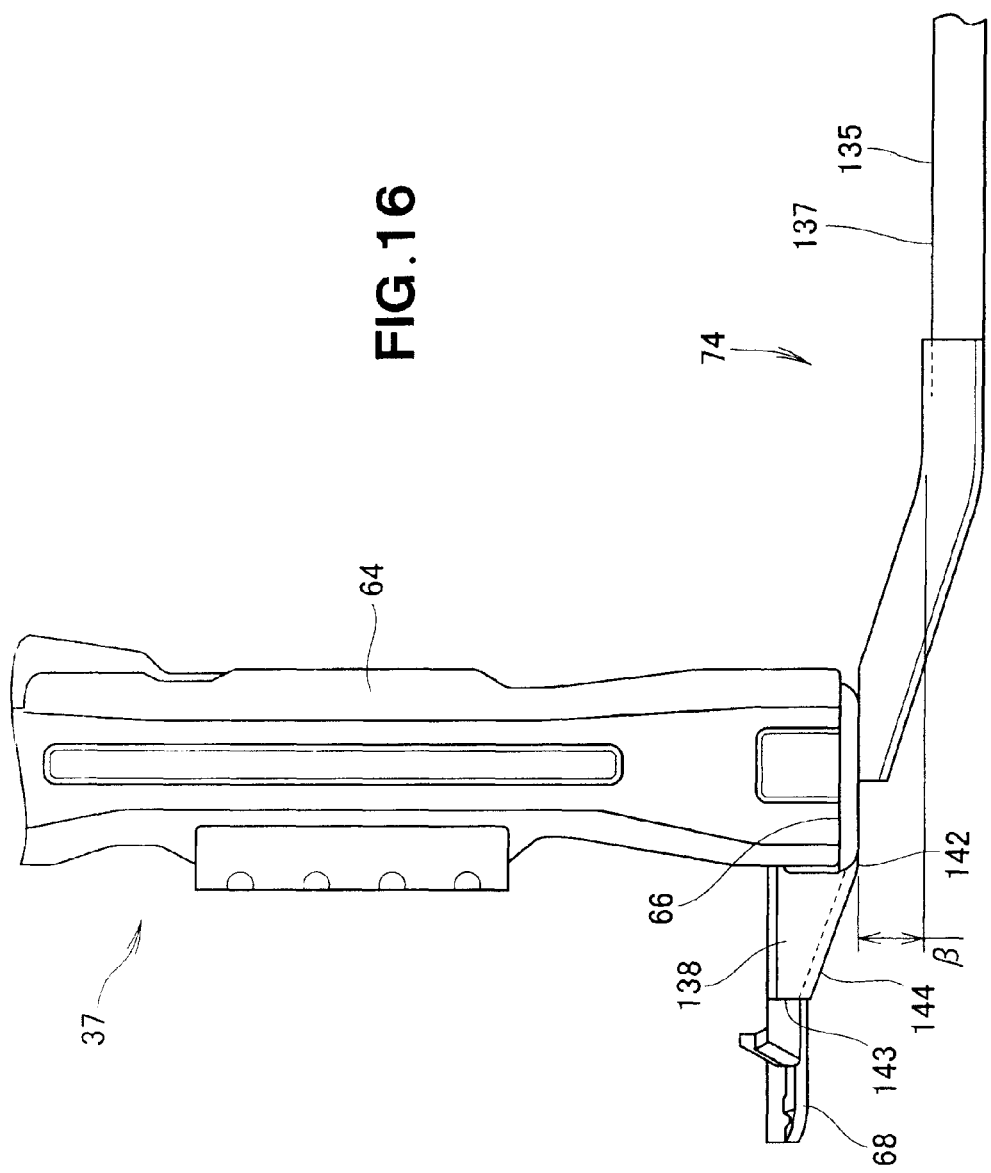
FIG. 16 is a side view showing an impact absorbing projecting member and a lower impact absorbing bar member employed in the embodiment.
Figure 17:
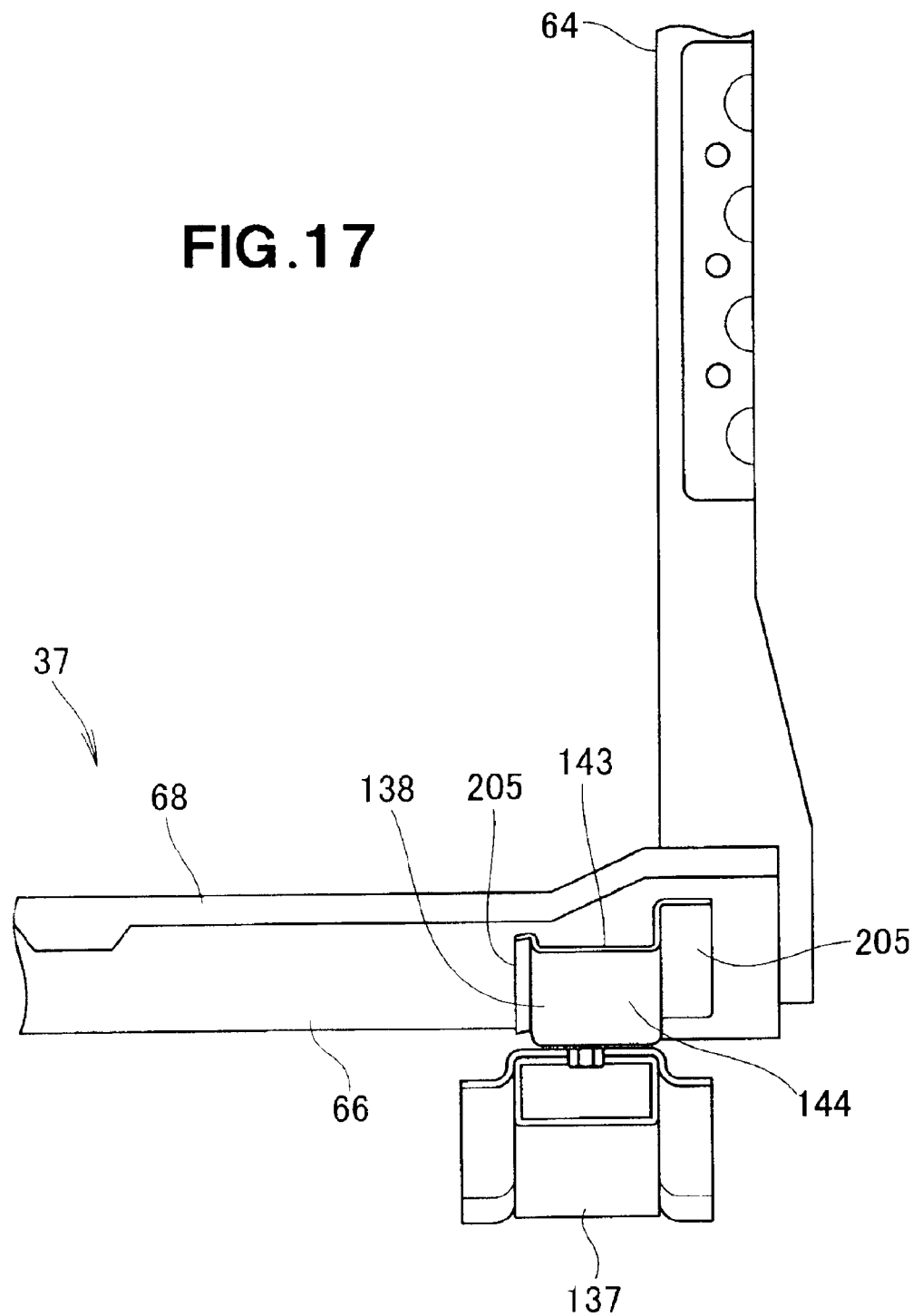
FIG. 17 is a side view showing the impact absorbing projecting member and the lower impact absorbing bar member.

As shown in FIG. 16, the impact absorbing projecting member 138 is located higher by a distance β than the lower impact absorbing member 137. More specifically, a lower portion 142 of the impact absorbing projecting member 138 is located higher by a distance β than the horizontal intermediate portion 135 of the lower impact absorbing member 137.

As shown in side elevation of FIG. 16, the impact absorbing projecting member 138 has a triangular sectional shape and tapers toward the distal end 143, to thereby form a slanting impact absorbing portion 144. The slanting impact absorbing portion 144 faces downward of the vehicle 11 and is included in the absorbing body 138c.

As shown in FIGS. 1 and 2, each of the lower impact absorbing members 137 is fixedly joined at the rear end portion 141 to the sub frame 15 that is fixedly mounted to the front side frames 16 and 17 disposed in front of the floor (under body) 45 of the passenger compartment 71.

Next, a description will be given about behavior of the front vehicle body structure 12.

Figure 15:
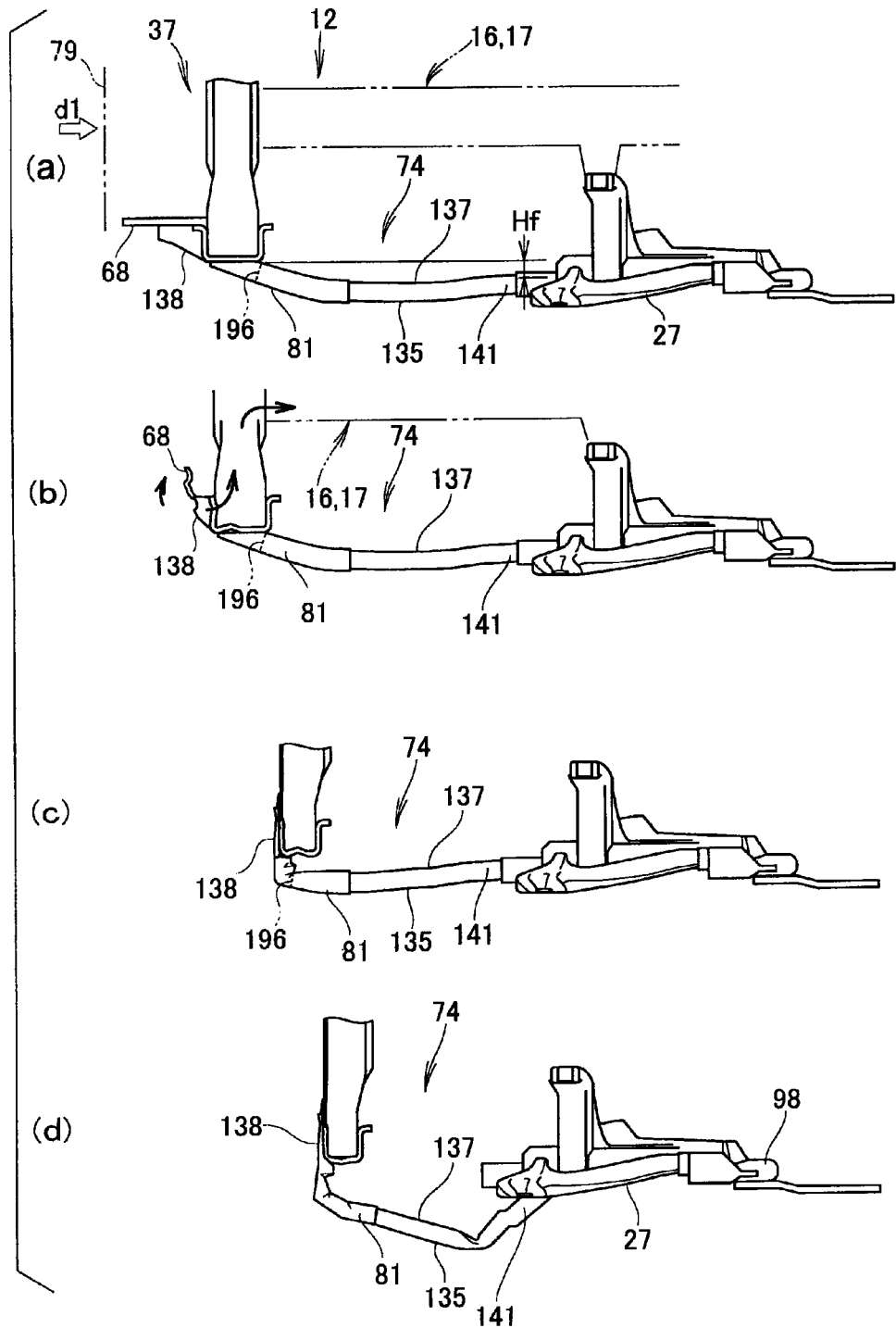
FIG. 15 is a view explanatory of a mechanism for absorbing an impact input to the front vehicle body structure, of which (a) is a side view of the front vehicle body structure before an impact is input, (b) is a side view of the front vehicle body structure showing behavior following the state of (a) of FIG. 15, (c) is a side view of the front vehicle body structure showing behavior following the state of (b) of FIG. 15, and (d) is a side view of the front vehicle body structure showing behavior following the state of (c) of FIG. 15.

First, with primary reference to FIG. 15, the following describe a mechanism provided in the embodiment of the front vehicle body structure 12 for absorbing an impact input thereto. Once an external obstacle, such as another vehicle, contacts the front surface 79 (FIG. 1) of the vehicle 11, the skid plate 68, the left and right impact absorbing projecting members 138 and the left and right bent impact absorbing members 81 and lower impact absorbing bar members 137 of the side beams 74 deform sequentially in the order mentioned (i.e., front-to-rear sequence), so that the front vehicle body structure 12 can effectively absorb the impact (load) while reducing a front-rear length of a deformed zone, i.e. crushable zone, of the vehicle 11.

More specifically, once an external obstacle contacts the front vehicle body structure 12 and thus an impact (load) is input to the front surface as indicated by arrow d1 in (a) of FIG. 15, the skid plate 68 deforms as shown in (b) of FIG. 15, and, substantially concurrently, the impact absorbing projecting members 138 too compressively deform.

The skid plate 68 and the impact absorbing projecting members 138 start deforming before the bent impact absorbing members 81 to transmit the impact (load) to the front frame section (bulkhead) 37 and front side frames 16 and 17. As a consequence, the front vehicle body structure 12 can effectively absorb a relatively small impact while reducing a front-rear length of a deformed zone, i.e. impact absorbing margin or crushable zone, of the vehicle 11.

Then, as shown in (c) of FIG. 15, the bent impact absorbing members 81 each bend in such a manner that the upper surface thereof "valley-folds" starting at the boundary portion 81c where the absorbing member 81 starts to be overlapped with the lower impact absorbing bar member 137 and thereby provides a change in plate thickness). Such valley-folding of the upper surface of each of the bent impact absorbing members 81 occurs because a front end portion of the absorbing member 81 is located higher than the boundary portion 81c and hence lies in non-collinear relation to the latter. Further, because the boundary portion 81c is where the plate thickness changes by the bent impact absorbing member 81 being overlapped with the lower impact absorbing bar member 137, the impact load would concentrate on the boundary portion 81c so that the boundary portion 81c becomes a bending start point in response to the input impact.

Finally, as shown in (d) of FIG. 15, the lower impact absorbing bar members 137 deform. Namely, the lower impact absorbing bar members 137 each bend in such a manner that the upper surface thereof valley-folds starting at or near a boundary between the horizontal intermediate portion 135, located below the impact absorbing projecting member 138, and the rear end portion 141.

In the aforementioned manner, the skid plate 68, the impact absorbing projecting members 138, and the bent impact absorbing members 81 and lower impact absorbing bar members 137 of the side beams 74 deform in the front-to-rear sequence, so that the front vehicle body structure 12 can effectively absorb the impact (load).

Further, in the front vehicle body structure 12, the engine accessory (e.g., compressor) 18a can be placed in a space provided above the bent impact absorbing members 81.

Figure 4:
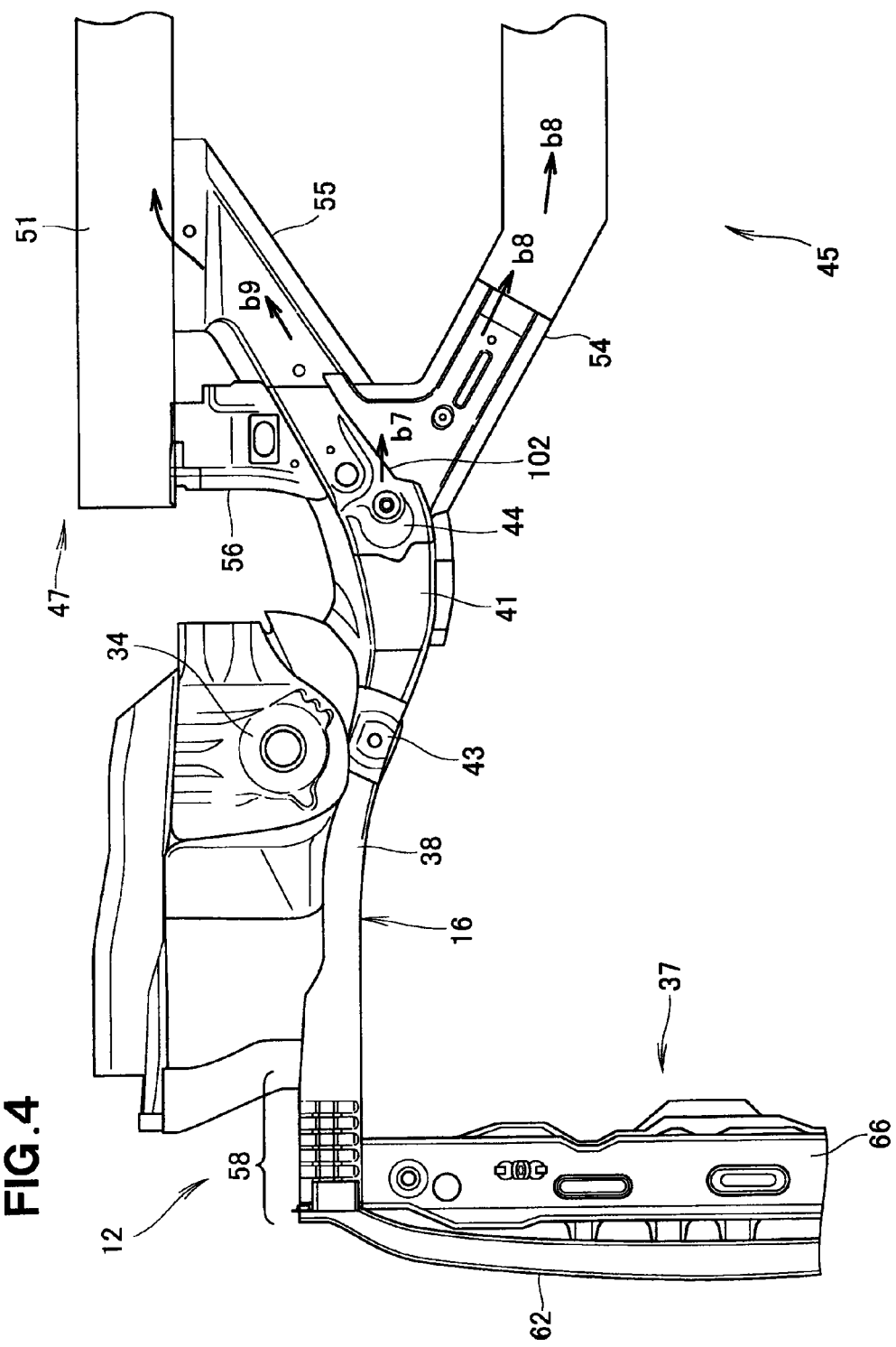
FIG. 4 is a bottom view of a left part of the embodiment of the front vehicle body structure.

Furthermore, once the impact (load) transmits from the front surface 79 of the vehicle 11 to the absorbing bar members 137, it then transmits from the absorbing bar members 137 to the neighboring lower arms 27 via the front wall 75. After that, the impact (load) can be dispersed from the lower arms 27 to the vehicle body 14 via a rear fastening portion 98 of the sub frame 15 and rear frame fastening section 44 as seen in FIG. 4.

Figure 19:
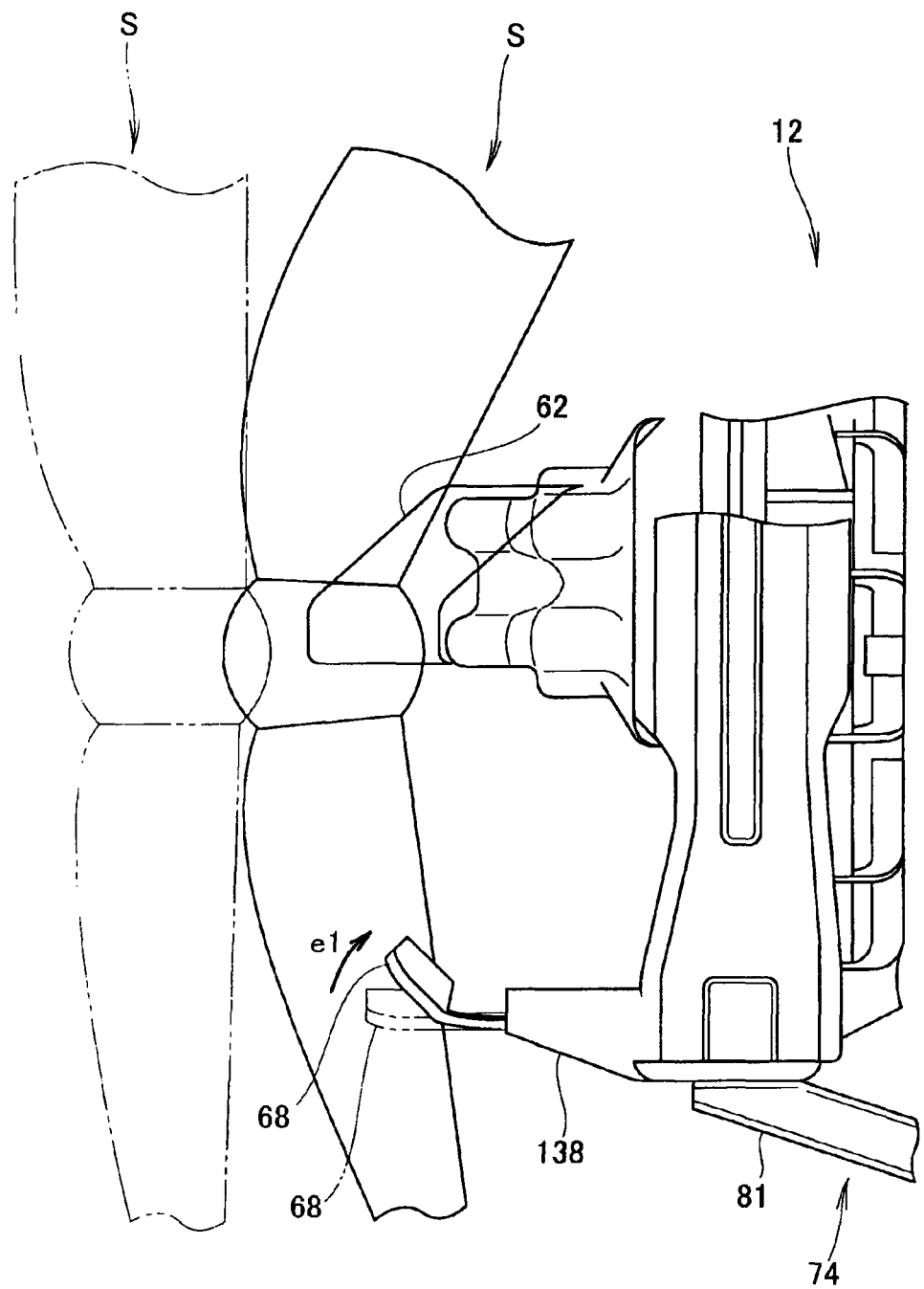
FIG. 19 is a view explanatory of a mechanism provided in the embodiment of the front vehicle body structure for absorbing an impact by means of a skid plate.

The following describe, with reference to FIGS. 19 and 20, a mechanism provided in the front vehicle body structure 12 for absorbing an input impact. Once an external obstacle, such as a person S, contacts the front surface 79 (FIG. 1) of the vehicle 11, the skid plate 68 deforms as indicated by arrow e1 and further the bent impact absorbing members 81 deform, and thus, the front vehicle body structure 12 can effectively absorb more of the impact more than in a case where only the skid plate 68 deforms. As a result, it is possible to reduce the deformation amount (impact absorbing margin) of the front vehicle body structure 12 necessary for absorbing the impact, and thus, the front-rear length of the front vehicle body structure 12b can be reduced. Namely, the skid plate 68 can effectively absorb a light collision impact (load) caused by contact with the person S, and thus, the front vehicle body structure 12 can protect legs of a pedestrian.

Further, once an external obstacle, such as another vehicle Sa, contacts the front surface 79 (FIG. 1) of the vehicle 11, as shown in FIG. 20, the bumper beam 62, skid plate 68, impact absorbing projecting members 138, etc. deform in response to the impact, to thereby absorb the input impact. Further, the front impact absorbing sections 58 of the frame bodies 38 of the front side frames 16 and 17 compressively deform so that the input impact can be absorbed more effectively.

Also, the bent impact absorbing members 81 and the absorbing bar members 137 bend in synchronism with the compressive deformation of the front impact absorbing sections 58 of the front side frames 16 and 17, and such bending of the bent impact absorbing members 81 and the absorbing bar members 137 so that the impact can be absorbed even more effectively.

In addition, the front vehicle body structure 12 can absorb the impact (load) by dispersing the impact from the rear end portions 141 of the absorbing bar members 137 to the sub frame 15.

In the aforementioned manner, the front vehicle body structure 12 of the present invention can not only protect legs of a pedestrian by means of the skid plate 68, but also effectively absorb an impact caused by contact (collision) with an external object, such as another vehicle Sa (FIG. 20), by means of the impact absorbing projecting members 138.

The front vehicle body structure of the present invention is well suited for application to automobiles.

What is claimed is:

1. A front vehicle body structure comprising:
   a sub frame disposed in front of a floor of a passenger compartment of a vehicle and extending in a left-right direction of the vehicle to be mounted to left and right front side frames that extend forward from the passenger compartment; and
   left and right side beams extending from the sub frame to a front frame section of the front vehicle body structure, each of the side beams including:
      a lower impact absorbing bar member having a horizontal intermediate portion joined to and extending forward from a front wall of the sub frame facing forward of the vehicle, and a slanting portion extending obliquely upward and forward continuously from the horizontal intermediate portion; and a bent impact absorbing member joined to the slanting portion and to the front frame section and having a smaller mechanical strength against an impact, input to a front surface of the vehicle, than the lower impact absorbing bar member, the bent impact absorbing member extending obliquely upward and forward from the slanting portion of the lower impact absorbing bar member,
   wherein the slanting portion and a part of the horizontal intermediate portion located adjoining the slanting portion of the lower impact absorbing bar member are fitted in and joined to the bent impact absorbing member, and
   wherein the bent impact absorbing member has a front portion in which the lower impact absorbing bar member is not fitted, and a boundary portion where the bent impact absorbing member starts to be overlapped with the slanting portion of the lower impact absorbing bar member, the front portion of the bent impact absorbing member having a front end portion located higher than the boundary portion.

2. The front vehicle body structure according to claim 1, wherein the bent impact absorbing member of each of the side beams has an upper surface contacting and joined to a lower surface of the front frame section.

3. The front vehicle body structure according to claim 1, which further comprises an impact absorbing projecting member provided in front of the bent impact absorbing member of each of the side beams, the impact absorbing projecting member extending substantially collinearly with a corresponding one of the bent impact absorbing members as viewed in plan of the vehicle and being located at a substantially same height as the bent impact absorbing member as viewed in side elevation of the vehicle.

4. The front vehicle body structure according to claim 1, wherein the sub frame includes the front wall facing forward of the vehicle, and a front arm connection section integrally provided on the front wall of the sub frame and supporting on each of left and right end portions thereof a lower arm of a suspension device, and wherein the lower impact absorbing bar member is joined at a rear end portion thereof to the front wall of the sub frame having the front arm connection section provided thereon.

5. The front vehicle body structure according to claim 3, which further comprises a skid plate projecting forwardly of the vehicle from the front frame section, and wherein the impact absorbing projecting member is joined integrally to the skid plate.

6. A front vehicle body structure comprising:
   a front frame section mounted to respective front ends of left and right front side frames extending forward from a passenger compartment of a vehicle;
   a skid plate mounted to a lower cross beam extending in a left-right direction of the vehicle and constituting a lower portion of the front frame section, the skid plate projecting forward of the vehicle from the lower cross beam;
   left and right lower impact absorbing bar members mounted to the lower cross beam and extending rearward of the vehicle; and
   left and right impact absorbing projecting members disposed in front of corresponding ones of the left and right lower impact absorbing bar members, each of the impact absorbing projecting members defining a closed sectional shape in conjunction with a rear portion of the skid plate,
   wherein the impact absorbing projecting member is overlapped with and joined to a lower surface of the rear portion of the skid plate and also is joined to the lower cross beam so that the closed sectional shape is defined between the impact absorbing projecting member and the rear portion of the skid plate.

7. The front vehicle body structure according to claim 6, wherein each of the lower impact absorbing bar members is mounted to the lower cross beam via a bent impact absorbing member and includes a slanting portion extending obliquely downward and rearward of the vehicle and a horizontal intermediate portion extending straightly rearward from the slanting portion, wherein the bent impact absorbing member has a front end portion joined to the lower cross beam, and wherein each of the impact absorbing projecting members has a lower portion located higher than the horizontal intermediate portion of the corresponding lower impact absorbing bar member.

8. The front vehicle body structure according to claim 6, wherein, as viewed in side elevation of the vehicle, each of the impact absorbing projecting members has a triangular shape and tapers toward a front end thereof to thereby provide a slanting impact absorbing frame portion.

9. The front vehicle body structure according to claim 6, wherein the skid plate has a bead extending in a front-rear direction of the vehicle along the impact absorbing projecting members.

10. The front vehicle body structure according to claim 6, wherein each of the lower impact absorbing bar members is joined at a rear end portion thereof to a sub frame disposed in front of a floor of the passenger compartment and mounted to the left and right front side frames.

* * * * *